(12) United States Patent
Ito et al.

(10) Patent No.: US 11,441,027 B2
(45) Date of Patent: Sep. 13, 2022

(54) EPOXY RESIN COMPOSITION, PREPREG, AND FIBER-REINFORCED COMPOSITE MATERIAL

(71) Applicant: Toray Industries, Inc., Tokyo (JP)

(72) Inventors: Akihiko Ito, Ehime (JP); Hiroaki Sakata, Ehime (JP)

(73) Assignee: TORAY INDUSTRIES, INC., Tokyo (JP)

( * ) Notice: Subject to any disclaimer, the term of this patent is extended or adjusted under 35 U.S.C. 154(b) by 103 days.

(21) Appl. No.: 16/755,945

(22) PCT Filed: Sep. 28, 2018

(86) PCT No.: PCT/JP2018/036279
§ 371 (c)(1),
(2) Date: Apr. 14, 2020

(87) PCT Pub. No.: WO2019/082595
PCT Pub. Date: May 2, 2019

(65) Prior Publication Data
US 2020/0247986 A1    Aug. 6, 2020

(30) Foreign Application Priority Data
Oct. 24, 2017   (JP) ............................. JP2017-205030

(51) Int. Cl.
| | |
|---|---|
| C08G 59/50 | (2006.01) |
| C08G 59/38 | (2006.01) |
| C08L 63/00 | (2006.01) |
| C08J 5/24 | (2006.01) |
| C08G 59/24 | (2006.01) |
| C08G 59/28 | (2006.01) |
| C08G 59/32 | (2006.01) |
| C08G 59/40 | (2006.01) |
| C08J 5/04 | (2006.01) |
| C08K 5/5397 | (2006.01) |
| C08L 81/06 | (2006.01) |

(52) U.S. Cl.
CPC ............ *C08L 63/00* (2013.01); *C08G 59/245* (2013.01); *C08G 59/28* (2013.01); *C08G 59/3227* (2013.01); *C08G 59/4014* (2013.01); *C08J 5/04* (2013.01); *C08J 5/24* (2013.01); *C08K 5/5397* (2013.01); *C08L 81/06* (2013.01); *C08L 2201/02* (2013.01); *C08L 2205/03* (2013.01)

(58) Field of Classification Search
None
See application file for complete search history.

(56) References Cited

U.S. PATENT DOCUMENTS

| | | | | |
|---|---|---|---|---|
| 2011/0046266 A1* | 2/2011 | Hefner, Jr. | .............. | C08L 63/00 523/400 |
| 2011/0319525 A1 | 12/2011 | Maeda et al. | | |
| 2012/0035299 A1* | 2/2012 | Arai | .......................... | C08J 5/24 523/427 |
| 2013/0281573 A1* | 10/2013 | Goto | ....................... | C08L 63/00 523/436 |
| 2017/0137563 A1 | 5/2017 | Tanaka et al. | | |

FOREIGN PATENT DOCUMENTS

| | | | | |
|---|---|---|---|---|
| DE | 19857697 A1 * | 6/2000 | ............. | C08K 5/353 |
| EP | 2883896 A1 | 6/2015 | | |
| JP | 01104624 A | 4/1989 | | |
| JP | 2001206932 A | 7/2001 | | |
| JP | 2002249641 A | 9/2002 | | |
| JP | 2012207205 A | 10/2012 | | |
| JP | 5614280 B2 | 10/2014 | | |
| JP | 2016153513 A | 8/2016 | | |
| JP | 2016190920 A | 11/2016 | | |
| JP | 2017141389 A | 8/2017 | | |
| JP | 2017149887 A | 8/2017 | | |

OTHER PUBLICATIONS

Machine translation of DE-19857697-A1 (no date).*
Hergenrother et al. "Flame Retardant Aircraft Epoxy Resins Containing Phosphorus"; Polymer 46 (2005) 5012-5024. (Year: 2005).*
Jain, P., Choudhary, V., & Varma, I. K.. Phosphorylated Epoxy Resin: Effect of Phosphorus Content on the Properties of Laminates. Journal of Fire Sciences, 21(1), 5-16. https://doi.org/10.1177/0734904103021001001 (Year: 2003).*
International Search Report and Written Opinion for International Application No. PCT/JP2018/036279, dated Dec. 4, 2018, 6 pages.

* cited by examiner

*Primary Examiner* — Michael J Feely
(74) *Attorney, Agent, or Firm* — RatnerPrestia

(57) ABSTRACT

The purpose of the present invention is to provide an epoxy resin composition which has excellent viscosity stability, and when cured, can provide a resin cured product which has high flame retardancy and excellent mechanical properties, and a prepreg and fiber-reinforced composite material using the epoxy resin composition. An embodiment of the epoxy resin composition according to the present invention which achieves the purpose contains all components [A]-[C]. [A]: A reactive diluent having a specific structure and a viscosity of 2 Pa·s or less at 25° C. [B]: An epoxy resin having three of more functional groups. [C]: An amine-based curing agent having a specific structure.

28 Claims, No Drawings

EPOXY RESIN COMPOSITION, PREPREG, AND FIBER-REINFORCED COMPOSITE MATERIAL

CROSS REFERENCE TO RELATED APPLICATIONS

This is the U.S. National Phase application of PCT/JP2018/036279, filed Sep. 28, 2018, which claims priority to Japanese Patent Application No. 2017-205030, filed Oct. 24, 2017, the disclosures of each of these applications being incorporated herein by reference in their entireties for all purposes.

FIELD OF THE INVENTION

The present invention relates to an epoxy resin composition including a phosphorus atom-containing hardener having a specific structure and two or more epoxy resins, a prepreg, and a fiber-reinforced composite material.

BACKGROUND OF THE INVENTION

Intermediate base materials including a composite material in which a carbon fiber or a glass fiber is used as a reinforced fiber, and a thermosetting resin such as an epoxy resin or a phenol resin is used as a matrix resin, with the reinforced fiber is impregnated with the resin, i.e. prepregs, are used in a wide range of applications including sports and leisure goods such as rackets for tennis and badminton, various kinds of industrial equipment, and civil engineering and aerospace fields. However, most thermosetting resins are flammable, and a fire hazard, and particularly for structural materials of aircrafts, vehicles and the like, flame-retardant thermosetting resins are required for preventing accidents caused by ignition and combustion. In addition, in electronic and electrical equipment, it is required to make the material flame-retardant for preventing a situation in which internally generated heat causes ignition and combustion of housings and components, leading to accidents.

As a means for making a matrix resin flame-retardant, an additive which makes the material less flammable, i.e. a flame retardant, is often added. Halogen compounds, phosphorus compounds, metal hydroxides, silicon compounds, nitrogen compounds and the like are generally used as flame retardants. Among them, phosphorus compounds ensure that cured products excellent in physical properties are obtained, and therefore some phosphorus compounds are used industrially. Examples of the flame-retardant technology using such a phosphorus compound include a technology in which an additive flame retardant such as red phosphorus or phosphate ester to an epoxy resin composition; and a technology in which phosphorus atoms are introduced to a crosslinked structure by using a reactive flame retardant which contains phosphorus atoms in the molecule, and reacts with a resin.

Patent Document 1 reports a flame-retardant technology using a phosphoric acid ester. A phosphoric acid ester has a low content of phosphorus atoms in the compound as compared to red phosphorus, and is therefore required to be blended in a large amount for securing sufficient flame retardance. Here, there is the problem that the phosphoric acid ester acts as a plasticizer, so that the heat resistance and mechanical property of the resin are significantly reduced.

Thus, Patent Document 2 reports a flame-retardant technology using a phosphine oxide having an amino group and having a structure in which a phosphorus atom and a carbon bond are covalently bonded in the molecule. The phosphine oxide has an amino group, and therefore reacts with the epoxy resin to form a crosslinked structure, flame retardance can be imparted without deteriorating the mechanical property of the product.

In addition, Patent Document 3 reports a technology in which by using a difunctional epoxy resin having an epoxy equivalent weight in a specific range and tris(aminophenyl) phosphine oxide having three amino groups, a high glass transition temperature is attained, and sufficient fluidity can be secured during molding.

PRIOR ART DOCUMENTS

Patent Documents

Patent Document 1: Japanese Patent No. 5614280

Patent Document 2: Japanese Patent Laid-open Publication No. 2001-206932

Patent Document 3: Japanese Patent Laid-open Publication No. 2002-249641

SUMMARY OF THE INVENTION

When a phosphine oxide having an amino group as described in Patent Document 2 or 3, high heat resistance and excellent flame retardance can be imparted, but it is difficult to control reaction with an epoxy resin, so that reaction proceeds even at a low temperature, resulting in low viscosity stability. Thus, there is a problem with process performance in production of a prepreg or a molding.

Accordingly, an object of the present invention is to solve the above-described problems, that is, to provide an epoxy resin composition which is excellent in viscosity stability and which can be formed into a cured resin having high flame retardance and an excellent mechanical property when cured; and a prepreg and a fiber-reinforced composite material obtained using the epoxy resin composition.

The epoxy resin composition according to embodiments of the present invention has the following configuration (configuration 1) or (configuration 2) for achieving the above-described object. Specifically, (configuration 1) an epoxy resin composition including all of following components [A] to [C]:

[A]: reactive diluent having a structure represented by following general formula (1) and having a viscosity of 2 Pa·s or less at 25° C.;

[B]: trifunctional or higher functional epoxy resin; and

[C]: at least one amine-based hardener selected from the group consisting of an amine-based hardener having a structure represented by following general formula (2) and an amine-based hardener having a structure represented by following general formula (3):

[Chemical Formula 1]

$$X^1—Y—X^2 \quad (1)$$

(in the general formula (1), $X^1$ represents a glycidyl ether group or a glycidylamino group; $X^2$ represents a hydrogen atom, a glycidyl ether group, or a glycidylamino group; and Y represents a divalent substituent with a carbon number of 7 or more),

[Chemical Formula 2]

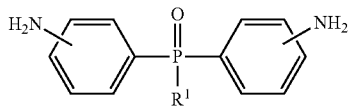
(2)

[Chemical Formula 3]

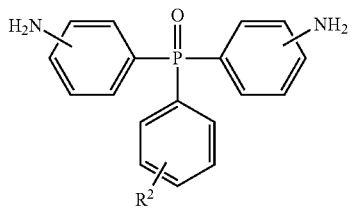
(3)

(in the general formula (2), $R^1$ represents a hydrocarbon group with a carbon number of 2 to 4; and in the general formula (3), $R^2$ represents a hydrogen atom or an amino group); and (configuration 2) an epoxy resin composition including all following component [A'], component [B] and component [C'], the epoxy resin composition having a component [A'] content of 10 to 50 parts by mass and a component [B] content of 50 to 90 parts by mass based on 100 parts by mass of the total amount of epoxy resins:

[A']: difunctional or lower functional glycidyl amine epoxy resin having one or more ring structures having at least a 4-membered ring;

[B]: trifunctional or higher functional epoxy resin; and

[C']: at least one amine-based hardener selected from the group consisting of an amine-based hardener having a structure represented by following general formula (5) and an amine-based hardener having a structure represented by following general formula (6):

[Chemical Formula 4]

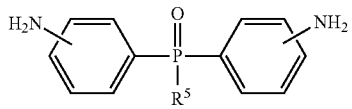
(5)

[Chemical Formula 5]

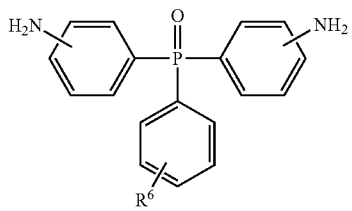
(6)

(in the general formula (5), $R^5$ represents a hydrocarbon group with a carbon number of 1 to 4; and in general formula (6), $R^6$ represents a hydrogen atom or an amino group).

In addition, the prepreg according to embodiments of the present invention is a prepreg obtained by impregnating a reinforced fiber with the epoxy resin composition.

Further, the fiber-reinforced composite material according to embodiments of the present invention is a fiber-reinforced composite material obtained by curing the prepreg, or a fiber-reinforced composite material including a cured resin obtained by curing the epoxy resin composition, and a reinforced fiber.

According to the present invention, it is possible to provide an epoxy resin composition which is excellent in viscosity stability and which can be formed into a cured resin having high flame retardance and an excellent mechanical property when cured; and a prepreg and a fiber-reinforced composite material obtained using the epoxy resin composition.

DETAILED DESCRIPTION OF EMBODIMENTS OF THE INVENTION

The epoxy resin composition in (configuration 1) of an exemplary embodiment of the present invention includes all following components [A] to [C]:

[A]: reactive diluent having a structure represented by following general formula (1) and having a viscosity of 2 Pa·s or less at 25° C.;

[B]: trifunctional or higher functional epoxy resin; and

[C]: at least one amine-based hardener selected from the group consisting of an amine-based hardener having a structure represented by following general formula (2) and an amine-based hardener having a structure represented by following general formula (3).

[Chemical Formula 6]

$$X^1—Y—X^2 \qquad (1)$$

In the general formula (1), $X^1$ represents a glycidyl ether group or a glycidylamino group. $X^2$ represents a hydrogen atom, a glycidyl ether group, or a glycidylamino group; and Y represents a divalent substituent with a carbon number of 7 or more.

[Chemical Formula 7]

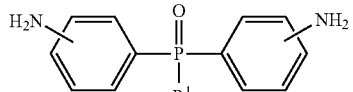
(2)

[Chemical Formula 8]

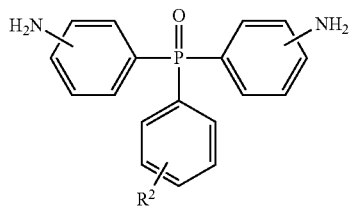
(3)

In the general formula (2), $R^1$ represents a hydrocarbon group with a carbon number of 2 to 4. In the general formula (3), $R^2$ represents a hydrogen atom or an amino group.

In the above general formula (1), it is preferable that $X^1$ is a glycidylamino group and $X^2$ is a hydrogen atom from the viewpoint of maintaining and improving the flexural modulus of the cured resin and the compression strength of the fiber-reinforced composite material. In addition, when the viscosity of an epoxy resin composition excessively increases, the epoxy resin composition has an excessively high viscosity, so that there arises a problem with handleability. Therefore, the carbon number of Y is preferably 12 or less.

When the carbon number of $R^1$ decreases in the above general formula (2), the moisture absorption resistance of the resulting cured resin may be reduced because the hydrophobicity of the amine-based hardener having a structure represented by the general formula (2) is reduced. Thus, the carbon number of $R^1$ is preferably 4.

Component [A] used in (configuration 1) of an embodiment of the present invention is a reactive diluent having a structure represented by the general formula (1) and having a viscosity of 2 Pa·s or less at 25° C. The reactive diluent reacts with the hardener during curing.

It is preferable that in particular, component [A] has a structure represented by any one of following general formulae (4), (7) and (8).

[Chemical Formula 9]

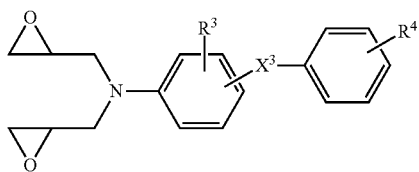

(4)

In the general formula (4), $R^3$ and $R^4$ each represent at least one selected from the group consisting of a hydrogen atom, an aliphatic hydrocarbon group with a carbon number of 1 to 4, an alicyclic hydrocarbon group with a carbon number of 3 to 6, an aromatic hydrocarbon group with a carbon number of 6 to 10, a halogen atom, an acyl group, a trifluoromethyl group and a nitro group. $X^3$ represents one selected from —O—, —S—, —CO—, —C(=O)O— and —SO$_2$—. When the molecular weight of the reactive diluent having a structure represented by the general formula (4) increases, handleability may be deteriorated because the viscosity of the epoxy resin composition increases. Therefore, $R^3$ and $R^4$ are preferably hydrogen.

[Chemical Formula 10]

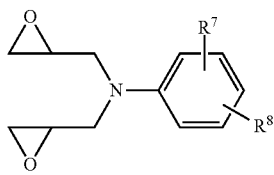

(7)

In the general formula (7), $R^7$ and $R^8$ each represent one selected from a hydrogen atom, an aliphatic hydrocarbon group with a carbon number of 1 to 4, an alicyclic hydrocarbon group with a carbon number of 3 to 6, an aromatic hydrocarbon group with a carbon number of 6 to 10, a halogen atom, an acyl group, a trifluoromethyl group and a nitro group. Both of $R^7$ and $R^8$ are not hydrogen atoms. When $R^7$ and $R^8$ are aliphatic hydrocarbon groups, the number of methylene groups with high flammability increases as the carbon number of $R^7$ and $R^8$ increases. Thus, from the viewpoint of flame retardance, $R^7$ and $R^8$ are each preferably a group with a carbon number of 1, that is, a methyl group. Similarly, from the viewpoint of flame retardance, $R^7$ and $R^8$ are each preferably a halogen atom such as Br or Cl.

[Chemical Formula 11]

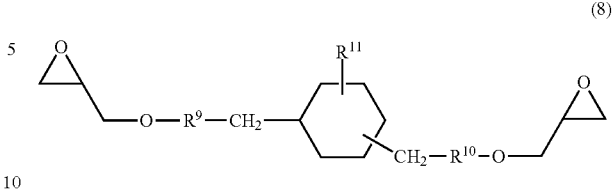

(8)

In the general formula (8), $R^9$ and $R^{10}$ each represent an alkylene group with a carbon number of 0 to 8, a phenylene group or a cyclohexylene group. $R^{11}$ represents one selected from a hydrogen atom, an aliphatic hydrocarbon group with a carbon number of 1 to 4, an alicyclic hydrocarbon group with a carbon number of 3 to 6, an aromatic hydrocarbon group with a carbon number of 6 to 10, a halogen atom, an acyl group, a trifluoromethyl group and a nitro group. Similarly, the number of methylene groups with high flammability increases as the carbon number of $R^9$ and $R^{10}$ increases. Thus, from the viewpoint of flame retardance, $R^9$ and $R^{10}$ are each preferably a group with a carbon number of 0 carbon atoms, that is, a direct bond. Similarly, from the viewpoint of flame retardance, $R^{11}$ is preferably a hydrogen atom.

Specific examples of component [A] include monoamine epoxy resins such N,N-diglycidyl-4-phenoxyaniline, N,N-diglycidyl-o-toluidine, N,N-diglycidyl-m-toluidine, N,N-diglycidyl-p-toluidine, N,N-diglycidyl-2,3-xylidine, N,N-diglycidyl-2,4-xylidine, N,N-diglycidyl-3,4-xylidine; and ether epoxy resins such as 1,4-cyclohexanedimethanol diglycidyl ether and 1,4-cyclohexanediethanol diglycidyl ether. Among these, monoamine epoxy resins, which are excellent in flame retardance and mechanical property, are particularly preferable. These epoxy resins of component [A] may be used singly, or in combination of two or more thereof.

The epoxy resin of component [B] for use in the present invention is not particularly limited as long as it is a trifunctional or higher functional epoxy resin, and it is preferable that one or more ring structures are present per molecule from the viewpoint of heat resistance. Among these, an epoxy resin represented by following general formula (9) is preferable.

[Chemical Formula 12]

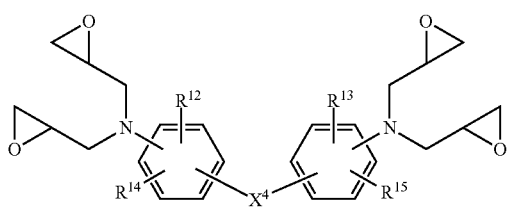

(9)

In the general formula (9), $R^{12}$ to $R^{15}$ each represent one selected from a hydrogen atom, an aliphatic hydrocarbon group with a carbon number of 1 to 4, and a halogen atom. $X^4$ represents one selected from —CH$_2$—, —O—, —S—, —CO—, —C(=O)O—, —SO$_2$—, —CH(CH$_3$)—, —C(CH$_3$)$_2$— and —CONH—.

When the carbon number of $R^{12}$ to $R^{15}$ is excessively large, the epoxy resin composition may have an excessively high viscosity, or compatibility between component [B] and other components in the epoxy resin composition may be impaired, leading to reduction of the mechanical property of material of the resulting fiber-reinforced composite material. Thus, the total carbon number of $R^{12}$ to $R^{15}$ is preferably 4 or less. More preferably, all of $R^{12}$ to $R^{15}$ are hydrogen atoms.

Specific examples of component [B] include the following epoxy resins. That is, examples of the trifunctional epoxy resin include aminophenol epoxy resins such as N,N,O-triglycidyl-m-aminophenol, N,N,O-triglycidyl-p-aminophenol, N,N,O-triglycidyl-4-amino-3-methylphenol. Examples of the tetrafunctional epoxy resin include diamine epoxy resins such as N,N,N',N'-tetraglycidyl-4,4'-methylenedianiline, N,N,N',N'-tetraglycidyl-2,2'-diethyl-4,4'-methylenedianiline and N,N,N',N'-tetraglycidyl-m-xylylenediamine. Among these, diamine epoxy resins provide a cured product having high heat resistance and elastic modulus because four glycidyl groups are present per molecule. Thus, the diamine epoxy resin is suitably used in aerospace applications.

In (configuration 1) of the present invention, it is preferable that the content of component [A] is 10 to 50 parts by mass and the content of component [B] is 50 to 90 parts by mass based on 100 parts by mass of the total amount of epoxy resins including component [A], component [B] and epoxy resins other than components [A] and [B] from the viewpoint of securing excellent heat resistance and mechanical property. The content of component [B] is more preferably 60 to 80 parts by mass. In (configuration 1), the total amount of epoxy resins means the total amount of epoxy resins including component [A], component [B] and epoxy resins other than components [A] and [B].

In (configuration 1) of the present invention, epoxy resins other than components [A] and [B] can be incorporated. Examples of such epoxy resins include difunctional or lower functional glycidyl ether epoxy resins. Examples include bisphenol epoxy resins such as bisphenol A epoxy resins, bisphenol F epoxy resins, bisphenol AD epoxy resins and bisphenol S epoxy resins; epoxy resins having a biphenyl skeleton; epoxy resins having a naphthalene skeleton; and epoxy resins having a dicyclopentadiene skeleton.

Component [C] in (configuration 1) of an exemplary embodiment of the present invention is at least one amine-based hardener selected from the group consisting of an amine-based hardener having a structure represented by following general formula (2) and an amine-based hardener having a structure represented by following general formula (3). By adding such an amine-based hardener to the epoxy resin composition, flame retardance is imparted. In addition, the component functions as a hardener for the epoxy resin, a cured product having a high degree of cure is obtained.

Examples of component [C] in (configuration 1) of an exemplary embodiment of the present invention include tris(4-aminophenyl)phosphine oxide, tris(3-aminophenyl)phosphine oxide, tris(2-aminophenyl)phosphine oxide, bis(4-aminophenyl)phenylphosphine oxide, bis(3-aminophenyl)phenylphosphine oxide, bis(4-aminophenyl)ethylphosphine oxide, bis(3-aminophenyl)ethylphosphine oxide, bis(2-aminophenyl)ethylphosphine oxide, bis(4-aminophenyl)n-propylphosphine oxide, bis(3-aminophenyl)n-propylphosphine oxide, bis(4-aminophenyl)isopropylphosphine oxide, bis(3-aminophenyl)isopropylphosphine oxide, bis(4-aminophenyl)n-butylphosphine oxide, bis(3-aminophenyl)n-butylphosphine oxide, bis(4-aminophenyl)isobutylphosphine oxide and bis(3-aminophenyl)isobutylphosphine oxide. Among these, tris(3-aminophenyl)phosphine oxide is preferably used because it is excellent in viscosity stability and heat resistance.

In (configuration 1) of the present invention, the content of component [C] based on 100 parts by mass of the total amount of epoxy resins is preferably 10 to 100 parts by mass from the viewpoint of securing the viscosity stability of the resin composition, and the flame retardance and mechanical property of the resulting cured product and fiber-reinforced composite material, and is more preferably 25 to 100 parts by mass.

When the content of component [C] in (configuration 1) of an embodiment of the present invention is 0.1 to 5.0% by mass as the phosphorus atom content in the epoxy resin composition, both the flame retardance and the mechanical property of the resulting cured product and the fiber-reinforced composite material can be secured. The phosphorus atom content is preferably 0.3 to 4.0% by mass. The phosphorus atom content (mass %) here is determined from: mass of phosphorus atoms in entire epoxy resin composition (g)/entire epoxy resin composition (g)×100. The mass of phosphorus atoms is obtained in the following manner: the mass of phosphorus atoms per molecule of the compound of component [C] is determined from the atomic weight of the phosphorus atom, and the number of molecules of the compound of component [C] present in the entire epoxy resin composition is determined from the number of moles, and multiplied by the mass of phosphorus atoms. The phosphorus atom content in the epoxy resin composition can be determined either by the above-mentioned calculation method or by organic elementary analysis or ICP-MS (inductively coupled plasma mass spectroscopy) of the epoxy resin composition or cured resin.

In (configuration 1) of the present invention, a hardener other than the component [C] can be incorporated. The hardener here is a hardener for epoxy resin, which is a compound having an active group capable of reacting with an epoxy group. Examples of the hardener other than component [C] include dicyandiamide, aromatic polyamines, amino benzic acid ester types, various acid anhydrides, phenol novolac resins, cresol novolac resins, polyphenol compounds, imidazole derivatives, aliphatic amines, tetramethylguanidine, thiourea addition amines, carboxylic acid anhydrides such as methylhexahydrophthalic acid anhydrides, carboxylic acid hydrazides, carboxylic acid amides, polymercaptan, and Lewis acid complexes such as boron trifluoride ethylamine complexes. When among these hardeners, an aromatic polyamine is used as a hardener, a cured epoxy resin having good heat resistance is easily obtained. In particular, when among aromatic polyamines, various isomers of diaminodiphenyl sulfone such as 4,4'-diaminodiphenyl sulfone and 3,3'-diaminodiphenyl sulfone are used, a cured epoxy resin with good heat resistance is easily obtained.

The content of the hardener other than the component [C] is preferably 90 parts by mass or less based on 100 parts by mass of the total amount of hardeners including component [C] and hardeners other than component [C] because the flame retardance of the resulting cured product and fiber-reinforced composite material is easily secured.

The epoxy resin composition in (configuration 2) of an embodiment of the present invention includes all following components [A'], [B] and [C'].

[A']: difunctional or lower functional glycidyl amine epoxy resin having one or more ring structures having at least a 4-membered ring;

[B]: trifunctional or higher functional epoxy resin; and

[C]: at least one amine-based hardener selected from the group consisting of an amine-based hardener having a structure represented by following general formula (5) and an amine-based hardener having a structure represented by following general formula (6).

[Chemical Formula 13]

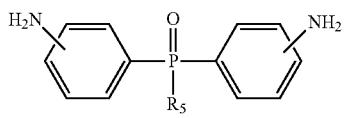

(5)

[Chemical Formula 14]

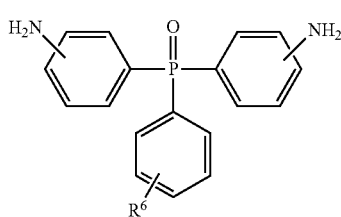

(6)

In the general formula (5), $R^5$ represents a hydrocarbon group with a carbon number of 1 to 4. In the general formula (6), $R^6$ represents a hydrogen atom or an amino group.

When the carbon number of $R^5$ decreases, the moisture absorption resistance of the resulting cured resin may be reduced because the hydrophobicity of the amine-based hardener having a structure represented by the general formula (5) is reduced. Thus, the carbon number of $R^5$ is preferably 2 to 4, more preferably 4.

The epoxy resin of the component [A'] used in (configuration 2) of an embodiment of the present invention is a glycidyl amine epoxy resin which has one or more ring structures having at least a 4-membered ring and has two or less glycidyl groups per molecule. In particular, it is preferable that component [A'] has a structure represented by following general formula (4).

[Chemical Formula 15]

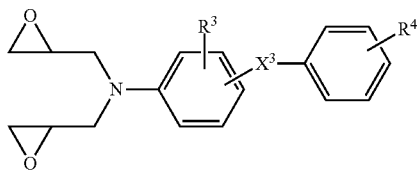

(4)

In the general formula (4), $R^3$ and $R^4$ each independently represent at least one selected from the group consisting of a hydrogen atom, an aliphatic hydrocarbon group with a carbon number of 1 to 4, an alicyclic hydrocarbon group with a carbon number of 3 to 6, an aromatic hydrocarbon group with a carbon number of 6 to 10, a halogen atom, an acyl group, a trifluoromethyl group and a nitro group. $X^3$ represents one selected from the group consisting of —O—, —S—, —CO—, —C(=O)O— and —SO$_2$—.

Since the viscosity of the epoxy resin composition increases as the carbon number of $R^3$ and $R^4$ increases, $R^3$ and $R^4$ are preferably hydrogen from the viewpoint of handleability.

Examples of component [A'] include monoamine epoxy resins such as N,N-diglycidyl-4-phenoxyaniline, N,N-diglycidyl-4-(4-methylphenoxy)aniline, N,N-diglycidyl-4-(3-methylphenoxy) aniline, N,N-diglycidyl-4-(2-methylphenoxy)aniline, N,N-diglycidyl-4-(4-ethylphenoxy)aniline, N,N-diglycidyl-4-(3-ethylphenoxy)aniline, N,N-diglycidyl-4-(2-ethylphenoxy) aniline, N,N-diglycidyl-4-(4-propylphenoxy)aniline, N,N-diglycidyl-4-(4-tert-butylphenoxy)aniline, N,N-diglycidyl-4-(4-cyclohexylphenoxy)aniline, N,N-diglycidyl-4-(3-cyclohexylphenoxy)aniline, N,N-diglycidyl-4-(2-cyclohexylphenoxy)aniline, N,N-diglycidyl-4-(4-methoxyphenoxy)aniline, N,N-diglycidyl-4-(3-methoxyphenoxy)aniline, N,N-diglycidyl-4-(2-methoxyphenoxy)aniline, N,N-diglycidyl-4-(4-phenoxyphenoxy)aniline, N,N-diglycidyl-4-(3-phenoxyphenoxy)aniline, N,N-diglycidyl-4-[4-(trifluoromethyl)phenoxy]aniline, N,N-diglycidyl-4-[3-(trifluoromethyl)phenoxy]aniline, N,N-diglycidyl-4-[2-(trifluoromethyl)phenoxy]aniline, N,N-diglycidyl-p-(2-naphthyloxyphenoxy)aniline, N,N-diglycidyl-p-(1-naphthyloxyphenoxy)aniline, N,N-diglycidyl-4-[(1,1'-biphenyl-4-yl)oxy]aniline, N,N-diglycidyl-4-(4-nitrophenoxy)aniline, N,N-diglycidyl-4-(3-nitrophenoxy) aniline, N,N-diglycidyl-4-(2-nitrophenoxy)aniline, N,N-diglycidyl-o-toluidine and N, N-diglycidyl aniline. When epoxy resins having these difunctional glycidyl groups are used, a cured product having high heat resistance and elastic modulus is obtained, and suitably used in aerospace applications.

These epoxy resins may be used singly, or in combination of two or more thereof.

In (configuration 2) of an embodiment of the present invention, the content of component [A'] based on 100 parts by mass of the total amount of epoxy resins is required to be 10 to 50 parts by mass from the viewpoint of securing excellent heat resistance and mechanical property, and is more preferably 25 to 40 parts by mass. In (configuration 2), the total amount of epoxy resins means the total amount of epoxy resins including component [A'], component [B] and epoxy resins other than components [A'] and [B].

In (configuration 2) of an embodiment of the present invention, the content of component [B] based on 100 parts by mass of the total amount of epoxy resins is required to be 50 to 90 parts by mass from the viewpoint of securing excellent heat resistance and mechanical property, and is more preferably 60 to 80 parts by mass.

In (configuration 2) of the present invention, epoxy resins other than components [A'] and [B] can be incorporated. Examples of epoxy resins other than components [A'] and [B] include difunctional or lower functional glycidyl ether epoxy resins. Examples of the difunctional or lower functional glycidyl ether epoxy resin include bisphenol epoxy resins such as bisphenol A epoxy resins, bisphenol F epoxy resins, bisphenol AD epoxy resins and bisphenol S epoxy resins; epoxy resins having a biphenyl skeleton; epoxy resins having a naphthalene skeleton; and epoxy resins having a dicyclopentadiene skeleton.

Component [C'] in (configuration 2) of an embodiment of the present invention is at least one amine-based hardener selected from the group consisting of an amine-based hardener having a structure represented by following general formula (5) and an amine-based hardener having a structure represented by following general formula (6). By adding these amine-based hardeners to the epoxy resin composition, flame retardance is easily imparted. In addition, the component functions as a hardener for the epoxy resin, a cured product having a high degree of cure is obtained.

Examples of component [C'] include tris(4-aminophenyl)phosphine oxide, tris(3-aminophenyl)phosphine oxide, tris(2-aminophenyl)phosphine oxide, bis(4-aminophenyl)phenylphosphine oxide, bis(3-aminophenyl)phenylphosphine oxide, bis(4-aminophenyl)methylphosphine oxide, bis(3-aminophenyl)methylphosphine oxide, bis(2-aminophenyl)methylphosphine oxide, bis(4-aminophenyl)ethylphosphine oxide, bis(3-aminophenyl)ethylphosphine oxide, bis(2-aminophenyl)ethylphosphine oxide, bis(4-aminophenyl)n-propylphosphine oxide, bis(3-aminophenyl)n-propylphosphine oxide, bis(4-aminophenyl)isopropylphosphine oxide, bis(3-aminophenyl)isopropylphosphine oxide, bis(4-aminophenyl)n-butylphosphine oxide, bis(3-aminophenyl)n-butylphosphine oxide, bis(4-aminophenyl)isobutylphosphine oxide and bis(3-aminophenyl)isobutylphosphine oxide. Among these, tris(3-aminophenyl)phosphine oxide is preferably used because it is excellent in viscosity stability and heat resistance.

In (configuration 2) of the present invention, the content of component [C'] based on 100 parts by mass of the total amount of epoxy resins including component [A'], component [B], and epoxy resins other than components [A'] and [B] is preferably 10 to 100 parts by mass from the viewpoint of securing the viscosity stability of the resin composition, and the flame retardance and mechanical property of the resulting cured product and fiber-reinforced composite material, and is more preferably 25 to 100 parts by mass.

When the content of component [C'] in (configuration 2) of an embodiment of the present invention is 0.1 to 5.0% by mass as the phosphorus atom content in the epoxy resin composition, both the flame retardance and the mechanical property of the resulting cured product and the fiber-reinforced composite material are easily secured. The phosphorus atom content is preferably 0.3 to 4.0% by mass. The method for determining the phosphorus atom content is as described above.

In the present invention, a hardener other than the component [C'] can be incorporated. The hardener here is a hardener for epoxy resin, which is a compound having an active group capable of reacting with an epoxy group. Examples of the compound include dicyandiamide, aromatic polyamines, amino benzic acid ester types, various acid anhydrides, phenol novolac resins, cresol novolac resins, polyphenol compounds, imidazole derivatives, aliphatic amines, tetramethylguanidine, thiourea addition amines, carboxylic acid anhydrides such as methylhexahydrophthalic acid anhydrides, carboxylic acid hydrazides, carboxylic acid amides, polymercaptan, and Lewis acid complexes such as boron trifluoride ethylamine complexes. When among these hardeners, an aromatic polyamine is used as a hardener, a cured epoxy resin having good heat resistance is obtained. In particular, when among aromatic polyamines, various isomers of diaminodiphenyl sulfone such as 4,4'-diaminodiphenyl sulfone and 3,3'-diaminodiphenyl sulfone are used, a cured epoxy resin with good heat resistance is obtained.

The content of the hardener other than the component [C'] is preferably 90 parts by mass or less based on 100 parts by mass of the total amount of hardeners including component [C'] and hardeners other than component [C'] because the flame retardance of the resulting cured product and fiber-reinforced composite material is secured.

In (configuration 1) or (configuration 2) of the present invention, a thermoplastic resin (component [D]) can be further incorporated for controlling the tackiness of the resulting prepreg, controlling the fluidity of the resin in impregnation of the reinforced fiber with the epoxy resin composition, and imparting toughness to the fiber-reinforced composite material. The thermoplastic resin of component [D] is preferably a thermoplastic resin composed of a polyaryl ether skeleton. Specific examples thereof include polysulfone, polyphenylsulfone, polyethersulfone, polyetherimide, polyphenylene ether, polyetheretherketone and polyetherethersulfone. These thermoplastic resins composed of a polyaryl ether skeleton may be used singly, or used in combination as appropriate. Among these, polyethersulfone and polyetherimide can be preferably used because toughness can be imparted without reducing the heat resistance and mechanical property of the resulting fiber-reinforced composite material.

In (configuration 1) or (configuration 2) of the present invention, particles mainly composed of a thermoplastic resin can be blended in order to improve the impact resistance of the obtained fiber-reinforced composite material.

The thermoplastic resin particles are most preferably particles of polyamides, and among polyamides, polyamide 12, polyamide 6, polyamide 11, polyamide 66, copolymers of polyamides 6 and 12, and polyamides formed into semi IPN with an epoxy compound (semi IPN polyamide) as described in Japanese Patent Laid-open Publication No. 1-104624, Example 1 give particularly good adhesive strength with the epoxy resin. Here, IPN is an abbreviation for Interpenetrating Polymer Network, which is a type of polymer blend. The IPN is a structure in which blend component polymers are crosslinked polymers, and different crosslinked polymers are partially or wholly entangled with one another to form a multi-network structure. The semi IPN is a structure in which a crosslinked polymer and a linear polymer form a heavy network structure. Particles of thermoplastic resin formed into semi IPN can be obtained by, for example, dissolving a thermoplastic resin and a thermosetting resin in the same solvent, uniformly mixing the mixture, and then performing reprecipitation. By using particles composed of an epoxy resin and a polyamide formed into semi IPN, excellent heat resistance and impact resistance can be imparted to the prepreg. The thermoplastic resin particles may be spherical particles, non-spherical particles or porous particles, and spherical particles are preferable because the fluidity of the resin is not reduced, excellent viscoelasticity is thus exhibited, and there is no origination point of stress concentration, so that high impact resistance is imparted. As commercially available polyamide particles, SP-500, SP-10, TR-1, TR-2, 842P-48 and 842P-80 (each manufactured by Toray Industries, Inc.); "Orgasol (registered trademark)" 1002D, 2001UD, 2001EXD, 2002D, 3202D, 3501D, 3502D (each manufactured by Arkema S.A.); and the like can be used. Of these polyamide particles, one type of polyamide particles may be used singly, or a plurality of types of polyamide particles may be used in combination.

The epoxy resin composition of (configuration 1) or (configuration 2) of the present invention may contain a coupling agent, thermosetting resin particles, or an inorganic filler such as silica gel, carbon black, clay, carbon nanotubes, graphene, carbon particles or metal powder as long as the effects of the present invention are not hindered.

The prepreg according to embodiments of the present invention is obtained by impregnating a reinforced fiber with the epoxy resin composition of the present invention. That is, the epoxy resin composition described above is used as a matrix resin, and this epoxy resin composition is combined with a reinforced fiber. Preferred examples of the reinforced fiber include carbon fibers, graphite fibers, aramid fibers and glass fibers. Among these, carbon fibers are particularly preferable from the viewpoint of the mechanical property.

The prepreg of the present invention can be produced by various known methods such as a wet process and a hot-melt process. Among these, the hot-melt process is preferable because the effect of the present invention is easily exhibited.

The hot-melt process is a method in which the viscosity is reduced by heating without using a solvent, and a reinforced fiber is impregnated. Examples of the hot-melt process include a method in which a reinforced fiber is directly impregnated with a matrix resin whose viscosity has been reduced by heating; and a method in which first, a matrix resin is applied onto a release paper or the like to prepare a release paper sheet with a resin film, the release paper sheet is then superposed on both sides or one side of a reinforced fiber, and heat and pressure are applied to impregnate the reinforced fiber with the matrix resin.

In the prepreg of the present invention, the areal weight of the reinforced fiber is preferably 100 to 1000 g/m². When the areal weight of the reinforced fiber is less than 100 g/m², it may be necessary to increase the number of layers for obtaining a predetermined thickness in formation of the fiber-reinforced composite material, resulting in complication of stacking operation. On the other hand, when the areal weight is more than 1000 g/m², the drapability of the prepreg tends to be deteriorated. The fiber mass content is preferably 40 to 90% by mass, more preferably 50 to 80% by mass. When the fiber mass content is less than 40% by mass, it may be impossible to take advantage of the excellent mechanical property of material of the reinforced fiber because the ratio of the resin is excessively high, or the amount of heat during curing of the fiber-reinforced composite material may be excessively large. When the fiber mass content is more than 90% by mass, the resulting fiber-reinforced composite material may have many voids because of occurrence of resin impregnation failure.

The form of the prepreg of the present invention is not limited, and the prepreg may be, for example, a UniDirection (UD) prepreg, a woven prepreg, or a nonwoven fabric such as a sheet molding compound.

The first aspect of the fiber-reinforced composite material of the present invention is obtained by curing the prepreg of the present invention. Such a fiber-reinforced composite material can be obtained by, for example, stacking the prepreg of the present invention in a predetermined form, and then curing the resin by applying heat and pressure. Here, as a method for applying heat and pressure, a known method such as an autoclave molding method, a press forming method, a bag molding method, a wrapping tape method or an internal pressure molding method can be used.

A second aspect of the fiber-reinforced composite material of the present invention contains a cured resin obtained by curing the epoxy resin composition of the present invention, and a reinforced fiber. Such a fiber-reinforced composite material can be obtained by a method in which without using a prepreg, a reinforced fiber base material is directly impregnated with a liquid epoxy resin, and the resin is cured. Specifically, for example, such a fiber-reinforced composite material can be obtained by a resin transfer molding method, a filament winding method, a pultrusion method, a hand layup method, or the like.

EXAMPLES

The present invention will be illustrated below with reference to Examples, but it should be understood that the present invention is not construed as being limited thereto.

The materials used in examples of (configuration 1) of the present invention and comparative examples are shown below.

<Component [A]: Reactive Diluent Represented by the General Formula (1) and Having a Viscosity of 2 Pa·s or Less at 25° C.>
  N,N-Diglycidyl-p-phenoxyaniline (PxGAN, manufactured by Toray Fine Chemical Co., Ltd.)
  N,N'-diglycidyl-o-toluidine GOT, manufactured by Nippon Kayaku Co., Ltd.)
  1,4-cyclohexanedimethanol diglycidyl ether ("DENACOL (registered trademark)" EX-216L, manufactured by Nagase ChemteX Corporation)

<Reactive Diluent Other than Component [A]>
  1,4-Butanediol diglycidyl ether "DENACOL" (registered trademark)" EX-214L (phenyl glycidyl ether, manufactured by Nagase ChemteX Corporation)

<Component [B]: Trifunctional or Higher Functional Epoxy Resin>
  Tetraglycidyldiaminodiphenylmethane ("Araldite (registered trademark)" MY721, manufactured by Huntsman Advanced Materials)

<Component [C]: Amine-Based Hardener Having a Structure Represented by the General Formula (2) or (3)>
  Tris(3-aminophenyl)phosphine oxide (manufactured by Katayama Chemical, Ltd.)
  Bis(3-aminophenyl)n-butylphosphine oxide (manufactured by Katayama Chemical, Ltd.)

<Hardeners Other than Component [C]>
  3,3'-Diaminodiphenyl sulfone (manufactured by Konishi Chemical IND Co., Ltd.)

<Component [D]: Thermoplastic Resin>
  Polyethersulfone ("VIRANTAGE (registered trademark)" VW-10700RFP, manufactured by Solvay Advanced Polymers)

The materials used in examples of (configuration 2) of the present invention and comparative examples are shown below.

<Component [A']: Difunctional or Lower Functional Glycidyl Amine Epoxy Resin Having One or More Ring Structures Having at Least a 4-Membered Ring>
  N,N'-diglycidyl aniline (GAN, manufactured by Nippon Kayaku Co., Ltd.)
  N,N-Diglycidyl-p-phenoxyaniline (PxGAN, manufactured by Toray Fine Chemical Co., Ltd.)

<Difunctional or Lower Functional Epoxy Resin Other than Component [A']>
  Bisphenol F epoxy resin ("EPICLON (registered trademark)" 830, manufactured by DIC Corporation)

<Component [B]: Trifunctional or Higher Functional Epoxy Resin>
  Tetraglycidyldiaminodiphenylmethane ("Araldite (registered trademark)" MY721, manufactured by Huntsman Advanced Materials)
  Tetraglycidyl diaminodiphenylmethane ("SUMI-EPDXY (registered trademark)" ELM434, manufactured by Sumitomo Chemical Co., Ltd.)
  Triglycidyl(p-aminophenol) ("Araldite (registered trademark)" MY510, manufactured by Huntsman Advanced Materials).

<Component [C']: Amine-Based Hardener Having a Structure Represented by General Formula (5) or (6)>
  Tris(3-aminophenyl)phosphine oxide (manufactured by Katayama Chemical, Ltd.)
  Bis(3-aminophenyl)n-butylphosphine oxide (manufactured by Katayama Chemical, Ltd.)

<Hardeners Other than Component [C']>
  4,4'-Diaminodiphenyl sulfone (SEIKACURE S manufactured by Wakayama Seika Kogyo Co., Ltd.)
  3,3'-Diaminodiphenyl sulfone (manufactured by Konishi Chemical IND Co., Ltd.)
<Component [D]: Thermoplastic Resin>
  Polyethersulfone ("Sumika Excel (registered trademark)" PES5003P, manufactured by Sumitomo Chemical Co., Ltd.)
  Polyethersulfone ("VIRANTAGE (registered trademark)" VW-10700RFP, manufactured by Solvay Advanced Polymers)

(1) Method for Preparing Epoxy Resin Composition

An epoxy resin corresponding to component [A] (or [A']) as shown in Tables 1 to 4, an epoxy resin other than component [A] (or [A']), an epoxy resin corresponding to component [B], and a thermoplastic resin corresponding to component [D] were put in a kneading machine, and then heated and kneaded to dissolve the thermoplastic resin. The mixture was then cooled to a temperature of 80° C. or lower, component [C] (or [C']) as shown in Tables 1 to 4 and a hardener other than component [C] (or [C']) were added, and the mixture was stirred to give an epoxy resin composition.

(2) Evaluation of Viscosity Stability

The viscosity stability of the resin composition was evaluated in the following manner.

The viscosity stability of the epoxy resin composition prepared in (1) was evaluated by measuring the viscosity with a dynamic viscoelasticity measuring apparatus (ARES, manufactured by TA Instruments). Using a parallel plate with a diameter of 40 mm, the viscosity was measured at a gap of 1.0 mm, a frequency of 0.5 Hz and a measurement temperature of 80° C., and the viscosity increase ratio (%) after 2 hours was used as an index of viscosity stability.

(3) Evaluation of Flame Retardance of Cured Resin

Evaluation of flame retardance by thermogravimetric analysis (TGA) was performed in the following manner.

The epoxy resin composition prepared in (1) was defoamed in a vacuum, and then cured under predetermined curing conditions in a mold set to a thickness of 2 mm with a 2-mm thick "TEFLON (registered trademark)" spacer to give a cured epoxy resin having a thickness of 2 mm. Evaluation of flame retardance was performed with a thermogravimetric analysis apparatus (TG-DTA) (AXS WS003 System from Bruker AXS GmbH). About 10 mg of a test piece was cut out from the cured epoxy resin, and simply heated at temperature elevation rate of 10° C./min, and the char generation ratio (%) at 650° C. was defined as an index of flame retardance. The char generation ratio mentioned here is a value represented by (mass of pyrolysis residue at 650° C. (g))/(mass of cured epoxy resin before measurement (g))×100.

Evaluation of flame retardance with a corn calorimeter was performed in the following manner.

The epoxy resin composition prepared in (1) was defoamed in a vacuum, and then cured in a mold set to a thickness of 1 mm with a 1-mm thick "TEFLON (registered trademark)" spacer to give a plate-shaped cured resin having a thickness of 1 mm. The flame retardance was evaluated with a cone calorimeter test apparatus (Cone calorimeter C3 (manufactured by Toyo Seiki Seisaku-sho, Ltd.)). A test piece of 100 mm×100 mm was cut out from the cured epoxy resin, and tested with the heater radiation amount set to 50 kW/m$^2$, and the peak heat release rate (kW/m$^2$) was defined as an index of flame retardance.

(4) Evaluation of Mechanical Property of Cured Resin

The mechanical property of the cured resin was evaluated in the following manner.

The cured epoxy resin prepared in (3) was cut to a size of 10 mm×60 mm to obtain a test piece, and in accordance with JIS K7171 (2006), a 3-point bending test was conducted on the test piece to evaluate the mechanical property. Using Instron 5565 Universal Testing Machine (manufactured by Instron Corporation), a bending test was conducted at a crosshead speed of 2.5 mm/min, a span length of 40 mm, an indenter diameter of 10 mm and a fulcrum diameter of 4 mm to measure the flexural modulus.

Examples 1 to 16 and Comparative Examples 1 to 5

Using each component at a ratio (parts by mass) as shown in Tables 1 to 4, an epoxy resin composition was prepared by the method for preparing an epoxy resin composition in (1). The viscosity stability of the obtained resin composition was evaluated. In addition, the flame retardance and the mechanical property of a cured resin obtained by curing the resin composition at a temperature of 180° C. for 2 hours. The evaluation results are shown in Tables 1 to 4.

TABLE 1

| | | Example 1 | Example 2 | Example 3 | Example 4 | Example 5 |
|---|---|---|---|---|---|---|
| Epoxy resin composition | Ingredient [A] Reactive diluent | | | | | |
| | N,N-Diglycidyl-o-toluidine (GOT) | | | | | |
| | N,N-Diglycidyl-p-phenoxyaniline (PxGAN) | | | | | |
| | 1,4-cyclohexanedimethanol diglycidyl ether ("DENACOL ®" EX-216L) | | | | | |
| | Reactive diluents other than component [A] | | | | | |
| | 1,4-Butanediol diglycidyl ether ("DENACOL ®" EX-214L) | | | | | |
| | Component [A'] Bifunctional glycidyl amine epoxy resin | | | | | |
| | N,N-Diglycidyl aniline | | | | | | 35 |
| | Diglycidyl-p-phenoxyaniline (PxGAN) | 35 | 35 | 35 | 35 | |
| | Difunctional or lower functional epoxy resins other than component [A'] | | | | | |
| | Bisphenol F epoxy resin resin ("EPICLON ®" 830) | | | | | |
| | Component [B] Trifunctional or higher functional epoxy resin | | | | | |
| | Triglycidyl (p-aminophenol) ("Araldite ®" MY510) | | | | | |

TABLE 1-continued

|  |  | Example 1 | Example 2 | Example 3 | Example 4 | Example 5 |
|---|---|---|---|---|---|---|
|  | Tetraglycidyl diaminodiphenylmethane ("Araldite ®" MY721) | 65 | 65 | 65 | 65 | 65 |
|  | Tetraglycidyl diaminodiphenylmethane ("SUMI-EPOXY ®" ELM434) |  |  |  |  |  |
|  | Component [C] (or Component [C']) Phosphorus-containing amine-based hardener |  |  |  |  |  |
|  | Tris(aminophenyl)phosphine oxide | 38 |  | 9 |  |  |
|  | Bis(aminophenyl)butylphosphine oxide |  | 51 |  | 8 | 59 |
|  | Non-phosphorus-containing hardener other than component [C] (or component [C']) |  |  |  |  |  |
|  | 3,3'-Diaminodiphenyl sulfone |  |  | 34 | 37 |  |
|  | Component [D] Thermoplastic resin |  |  |  |  |  |
|  | Polyethersulfone ("VIRANTAGE ®" VW-10700RFP) | 24 | 27 | 26 | 26 | 28 |
|  | Polyethersulfone ("Sumika Excel ®" PES5003P) |  |  |  |  |  |
| Phosphorus atom content in epoxy resin composition (%) |  | 2.3 | 3.1 | 0.5 | 0.5 | 3.4 |
| Properties of resin composition | Viscosity stability (%) | 7 | 30 | 29 | 18 | 51 |
| Properties of cured resin | Char production ratio at 650° C. (%) | 25 | 30 | 4 | 1 | 27 |
|  | Peak heat release rate (kW/m$^2$) | — | — | 1058 | 996 | 626 |
|  | Flexural modulus (GPa) | 4.5 | 4.1 | 4.5 | 4.3 |  |

TABLE 2

|  |  | Example 6 | Example 7 | Example 8 | Example 9 | Example 10 |
|---|---|---|---|---|---|---|
| Epoxy resin composition | Ingredient [A] Reactive diluent |  |  |  |  |  |
|  | N,N-Diglycidyl-o-toluidine (GOT) |  |  |  |  |  |
|  | N,N-Diglycidyl-p-phenoxyaniline (PxGAN) |  |  |  |  |  |
|  | 1,4-cyclohexanedimethanol diglycidyl ether ("DENACOL ®" EX-216L) |  |  |  |  |  |
|  | Reactive diluents other than component [A] |  |  |  |  |  |
|  | 1,4-Butanediol diglycidyl ether ("DENACOL ®" EX-214L) |  |  |  |  |  |
|  | Component [A'] Bifunctional glycidyl amine epoxy resin |  |  |  |  |  |
|  | N,N-Diglycidyl aniline |  |  |  |  |  |
|  | Diglycidyl-p-phenoxyaniline (PxGAN) | 50 | 10 | 35 | 35 | 35 |
|  | Difunctional or lower functional epoxy resins other than component [A'] |  |  |  |  |  |
|  | Bisphenol F epoxy resin resin ("EPICLON ®" 830) |  |  |  |  |  |
|  | Component [B] Trifunctional or higher functional epoxy resin |  |  |  |  |  |
|  | Triglycidyl(p-aminophenol) ("Araldite ®" MY510) |  |  | 65 |  |  |
|  | Tetraglycidyl diaminodiphenylmethane ("Araldite ®" MY721) | 50 | 90 |  | 65 | 65 |
|  | Tetraglycidyl diaminodiphenylmethane ("SUMI-EPOXY ®" ELM434) |  |  |  |  |  |
|  | Component [C] (or Component [C']) Phosphorus-containing amine-based hardener |  |  |  |  |  |
|  | Tris(aminophenyl)phosphine oxide | 17 | 18 | 18 | 7 | 5 |
|  | Bis(aminophenyl)butylphosphine oxide |  |  |  | 10 |  |
|  | Non-phosphorus-containing hardener other than component [C] (or component [C']) |  |  |  |  |  |
|  | 3,3'-Diaminodiphenyl sulfone | 22 | 27 | 27 | 28 | 38 |
|  | Component [D] Thermoplastic resin |  |  |  |  |  |
|  | Polyethersulfone ("VIRANTAGE ®" VW-10700RFP) | 25 | 26 | 26 | 26 | 25 |
|  | Polyethersulfone ("Sumika Excel ®" PES5003P) |  |  |  |  |  |
| Phosphorus atom content in epoxy resin composition (%) |  | 1.0 | 1.0 | 1.0 | 1.0 | 0.3 |
| Properties of resin composition | Viscosity stability (%) | 13 | 15 | 29 | 42 | 26 |
| Properties of cured resin | Char production ratio at 650° C. (%) | 12 | 15 | 12 | 15 | 4 |
|  | Peak heat release rate (kW/m$^2$) | — | — | — | — | — |
|  | Flexural modulus (GPa) | 4.6 | 4.5 | 4.6 | 4.3 | 4.3 |

TABLE 3

| | | Example 11 | Example 12 | Example 13 | Example 14 | Example 15 | Example 16 |
|---|---|---|---|---|---|---|---|
| Epoxy resin composition | Ingredient [A] Reactive diluent | | | | | | |
| | N,N-Diglycidyl-o-toluidine (GOT) | | | | 35 | | |
| | N,N-Diglycidyl-p-phenoxyaniline (PxGAN) | | | | | 35 | |
| | 1,4-cyclohexanedimethanol diglycidyl ether ("DENACOL ®" EX-216L) | | | | | | 35 |
| | Reactive diluents other than component [A] | | | | | | |
| | 1,4-Butanediol diglycidyl ether ("DENACOL ®" EX-214L) | | | | | | |
| | Component [A'] Bifunctional glycidyl amine epoxy resin | | | | | | |
| | N,N-Diglycidyl aniline | | | 35 | | | |
| | Diglycidyl-p-phenoxyaniline (PxGAN) | 35 | 35 | | | | |
| | Difunctional or lower functional epoxy resins other than component [A'] | | | | | | |
| | Bisphenol F epoxy resin resin ("EPICLON ®" 830) | | | | | | |
| | Component [B] Trifunctional or higher functional epoxy resin | | | | | | |
| | Triglycidyl(p-aminophenol) ("Araldite ®" MY510) | | | | | | |
| | Tetraglycidyl diaminodiphenylmethane ("Araldite ®" MY721) | 65 | 65 | 65 | 65 | 65 | 65 |
| | Tetraglycidyl diaminodiphenylmethane ("SUMI-EPOXY ®" ELM434) | | | | | | |
| | Component [C] (or Component [C']) Phosphorus-containing amine-based hardener | | | | | | |
| | Tris(aminophenyl)phosphine oxide | 2 | | 18 | 18 | 18 | 18 |
| | Bis(aminophenyl)butylphosphine oxide | | 16 | | | | |
| | Non-phosphorus-containing hardener other than component [C] (or component [C']) | | | | | | |
| | 3,3'-Diaminodiphenyl sulfone | 42 | 30 | 30 | 26 | 24 | 25 |
| | Component [D] Thermoplastic resin | | | | | | |
| | Polyethersulfone ("VIRANTAGE ®" VW-10700RFP) | 25 | 26 | 26 | 25 | 25 | 25 |
| | Polyethersulfone ("Sumika Excel ®" PES5003P) | | | | | | |
| Phosphorus atom content in epoxy resin composition (%) | | 0.1 | 1.0 | 1.0 | 1.0 | 1.0 | 1.0 |
| Properties of resin composition | Viscosity stability (%) | 13 | 47 | 42 | 12 | 16 | 23 |
| Properties of cured resin | Char production ratio at 650° C. (%) | 3 | 11 | 9 | 13 | 17 | 9 |
| | Peak heat release rate (kW/m²) | — | — | — | — | — | — |
| | Flexural modulus (GPa) | 4.3 | 4.3 | 4.6 | 4.8 | 4.5 | 3.8 |

TABLE 4

| | | Comparative Example 1 | Comparative Example 2 | Comparative Example 3 | Comparative Example 4 | Comparative Example 5 |
|---|---|---|---|---|---|---|
| Epoxy resin composition | Ingredient [A] Reactive diluent | | | | | |
| | N,N-Diglycidyl-o-toluidine (GOT) | | | | | |
| | N,N-Diglycidyl-p-phenoxyaniline (PxGAN) | | | | | |
| | 1,4-cyclohexanedimethanol diglycidyl ether ("DENACOL ®" EX-216L) | | | | | |
| | Reactive diluents other than component [A] | | | | | |
| | 1,4-Butanediol diglycidyl ether ("DENACOL ®" EX-214L) | | | | | 35 |
| | Component [A'] Bifunctional glycidyl amine epoxy resin | | | | | |
| | N,N-Diglycidyl aniline | | | | | |
| | Diglycidyl-p-phenoxyaniline (PxGAN) | | | 35 | | |
| | Difunctional or lower functional epoxy resins other than component [A'] | | | | | |
| | Bisphenol F epoxy resin resin ("EPICLON ®" 830) | | 10 | | 10 | 10 |
| | Component [B] Trifunctional or higher functional epoxy resin | | | | | |
| | Triglycidyl(p-aminophenol) ("Araldite ®" MY510) | | | | | |
| | Tetraglycidyl diaminodiphenylmethane ("Araldite ®" MY721) | | | 65 | | 65 |

TABLE 4-continued

| | | Comparative Example 1 | Comparative Example 2 | Comparative Example 3 | Comparative Example 4 | Comparative Example 5 |
|---|---|---|---|---|---|---|
| | Tetraglycidyl diaminodiphenylmethane ("SUMI-EPOXY ®" ELM434) | 90 | | 90 | 90 | |
| | Component [C] (or Component [C']) Phosphorus-containing amine-based hardener | | | | | |
| | Tris(aminophenyl)phosphine oxide | | | 17 | | 18 |
| | Bis(aminophenyl)butylphosphine oxide | | | | 16 | |
| | Non-phosphorus-containing hardener other than component [C] (or component [C']) | | | | | |
| | 3,3'-Diaminodiphenyl sulfone | 33 | 44 | 33 | 40 | 28 |
| | Component [D] Thermoplastic resin | | | | | |
| | Polyethersulfone ("VIRANTAGE ®" VW-10700RFP) | | 25 | | | 26 |
| | Polyethersulfone ("Sumika Excel ®" PES5003P) | 13 | | 13 | 13 | |
| Phosphorus atom content in epoxy resin composition (%) | | 0.0 | 0.0 | 1.0 | 1.0 | 1.0 |
| Properties of resin composition | Viscosity stability (%) | 64 | 8 | 57 | 102 | 57 |
| Properties of cured resin | Char production ratio at 650° C. (%) | 1 | 0 | 13 | 11 | 8 |
| | Peak heat release rate (kW/m²) | — | 1162 | — | — | — |
| | Flexural modulus (GPa) | 4.1 | 4.3 | 4.4 | 4.3 | 4.2 |

The invention claimed is:

1. An epoxy resin composition comprising:
at least one reactive diluent [A] having a viscosity of 2 Pas or less at 25° C. and selected from the group consisting of a reactive diluent having a structure represented by general formula (4), a reactive diluent having a structure represented by general formula (7), and a reactive diluent having a structure represented by general formula (8);
at least one trifunctional or higher functional epoxy resin [B] selected from the group consisting of N,N,O-triglycidyl-m-aminophenol, N,N,O-triglycidyl-p-aminophenol, N,N,O-triglycidyl-4-amino-3-methylphenol, N,N,N',N'-tetraglycidyl-4,4'-methylenedianiline, N,N,N',N'-tetraglycidyl-2,2'-diethyl-4,4'-methylenedianiline and N,N,N',N'-tetraglycidyl-m-xylylenediamine;
at least one amine-based hardener [C] selected from the group consisting of an amine-based hardener having a structure represented by general formula (2) and an amine-based hardener having a structure represented by general formula (3);
optionally, a non-phosphorus-containing aromatic polyamine hardener provided in an amount of up to 90 parts by mass based on 100 parts by mass total of [C] and the aromatic polyamine hardener; and
at least one thermoplastic resin [D] composed of a polyaryl ether skeleton:

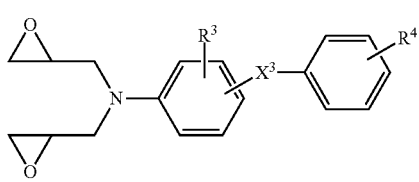

(4)

wherein in the general formula (4), $R^3$ and $R^4$ each independently represent at least one selected from the group consisting of a hydrogen atom, an aliphatic hydrocarbon group with a carbon number of 1 to 4, an alicyclic hydrocarbon group with a carbon number of 3 to 6, an aromatic hydrocarbon group with a carbon number of 6 to 10, a halogen atom, an acyl group, a trifluoromethyl group and a nitro group; and $X^3$ represents one selected from the group consisting of —O—, —S—, —CO—, —C(=O)O— and —S$_2$—;

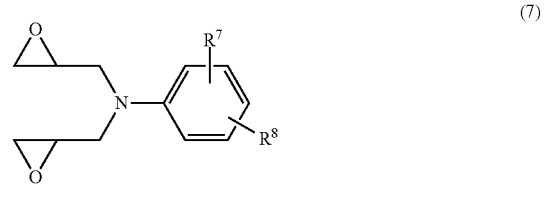

(7)

wherein in the general formula (7), $R^7$ and $R^8$ each independently represent at least one selected from the group consisting of a hydrogen atom, an aliphatic hydrocarbon group with a carbon number of 1 to 4, an alicyclic hydrocarbon group with a carbon number of 3 to 6, an aromatic hydrocarbon group with a carbon number of 6 to 10, a halogen atom, an acyl group, a trifluoromethyl group and a nitro group, with the proviso that both of $R^7$ and $R^8$ are not hydrogen atoms;

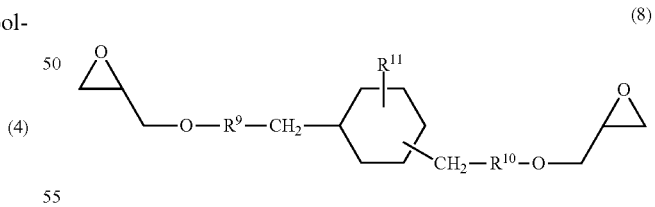

(8)

wherein in the general formula (8), $R^9$ and $R^{10}$ each independently represent a direct bond, an alkylene group with a carbon number of 1 to 8, a phenylene group or a cyclohexylene group; and $R^{11}$ represents one selected from the group consisting of a hydrogen atom, an aliphatic hydrocarbon group with a carbon number of 1 to 4, an alicyclic hydrocarbon group with a carbon number of 3 to 6, an aromatic hydrocarbon group with a carbon number of 6 to 10, a halogen atom, an acyl group, a trifluoromethyl group and a nitro group;

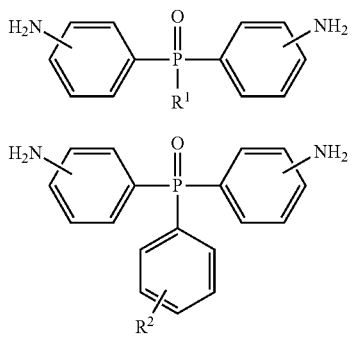

wherein in the general formula (2), $R^1$ represents a hydrocarbon group with a carbon number of 2 to 4; and in the general formula (3), $R^2$ represents a hydrogen atom or an amino group;

wherein [A] is present in an amount of 10 to 50 parts by mass and [B] is present in an amount of 50 to 90 parts by mass, totaling 100 parts by mass; and wherein [C] is present in amount to provide a phosphorus atom content of 1.0 to 5.0% by mass, based on the overall mass of the epoxy resin composition.

2. The epoxy resin composition according to claim 1, wherein [A] comprises a reactive diluent having a structure represented by general formula (4) or a reactive diluent having a structure represented by general formula (7).

3. The epoxy resin composition according to claim 1, wherein $R^3$ and $R^4$ of the general formula (4) is a hydrogen atom.

4. The epoxy resin composition according to claim 1, wherein at least one of $R^7$ and $R^8$ of the general formula (7) is a methyl group.

5. The epoxy resin composition according to claim 1, wherein [A] is selected from the group consisting of N,N-diglycidyl-4-phenoxyaniline, N,N-diglycidyl-o-toluidine, N,N-diglycidyl-m-toluidine, N,N-diglycidyl-p-toluidine, N,N-diglycidyl-2,3-xylidine, N,N-diglycidyl-2,4-xylidine, N,N-diglycidyl-3,4-xylidine, 1,4-cyclohexanedimethanol diglycidyl ether, and 1,4-cyclohexanediethanol diglycidyl ether.

6. The epoxy resin composition according to claim 1, wherein [A] is present in an amount of 20 to 40 parts by mass and [B] is present in an amount of 60 to 80 parts by mass, totaling 100 parts by mass.

7. The epoxy resin composition according to claim 1, wherein [C] comprises an amine-based hardener having a structure represented by general formula (3).

8. The epoxy resin composition according to claim 7, wherein $R^2$ in the general formula (3) is an amino group.

9. The epoxy resin composition according to claim 1, wherein [D] comprises polyethersulfone.

10. The epoxy resin composition according to claim 9, wherein [D] is present in amount of 24 to 27 parts by mass based on the total 100 parts by mass of [A] and [B].

11. The epoxy resin composition according to claim 1, wherein the optional aromatic polyamine hardener is not present, and the epoxy resin composition has a viscosity increase ratio after 2 hours at 80° C. of 7% to 30%, and a cured product of the epoxy resin composition has a flexural modulus of 4.1 to 4.5 GPa and a char production ratio at 650° C. of 25% to 30%.

12. The epoxy resin composition according to claim 1, wherein the optional aromatic polyamine hardener is present and is 3,3'-diaminodiphenyl sulfone.

13. The epoxy resin composition according to claim 12, wherein the epoxy resin composition has a viscosity increase ratio after 2 hours at 80° C. of 12% to 47%, and a cured product of the epoxy resin composition has a flexural modulus of 3.8 to 4.8 GPa and a char production ratio at 650° C. of 9% to 17%.

14. A prepreg obtained by impregnating a reinforced fiber with the epoxy resin composition described in claim 1.

15. A fiber-reinforced composite material obtained by curing the prepreg described in claim 14.

16. A fiber-reinforced composite material comprising a cured resin obtained by curing the epoxy resin composition described in claim 1, and a reinforced fiber.

17. An epoxy resin composition comprising
a difunctional glycidyl amine epoxy resin [A'] represented by general formula (4);
at least one trifunctional or higher functional epoxy resin [B] selected from the group consisting of N,N,O-triglycidyl-m-aminophenol, N,N,O-triglycidyl-p-aminophenol, N,N,O-triglycidyl-4-amino-3-methylphenol, N,N,N',N'-tetraglycidyl-4,4'-methylenedianiline, N,N,N',N'-tetraglycidyl-2,2'-diethyl-4,4'-methylenedianiline and N,N,N',N'-tetraglycidyl-m-xylylenediamine;
at least one amine-based hardener [C'] selected from the group consisting of an amine-based hardener having a structure represented by general formula (5) and an amine-based hardener having a structure represented by general formula (6);
optionally, a non-phosphorus-containing aromatic polyamine hardener provided in an amount of up to 90 parts by mass based on 100 parts by mass total of [C'] and the aromatic polyamine hardener; and
at least one thermoplastic resin [D] composed of a polyaryl ether skeleton:

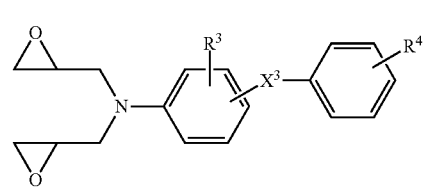

wherein in the general formula (4), $R^3$ and $R^4$ each independently represent at least one selected from the group consisting of a hydrogen atom, an aliphatic hydrocarbon group with a carbon number of 1 to 4, an alicyclic hydrocarbon group with a carbon number of 3 to 6, an aromatic hydrocarbon group with a carbon number of 6 to 10, a halogen atom, an acyl group, a trifluoromethyl group and a nitro group; and $X^3$ represents one selected from the group consisting of —O—, —S—, —CO—, —C(=O)O— and —SO$_2$—;

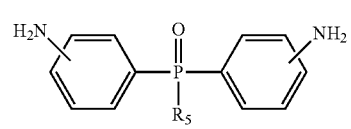

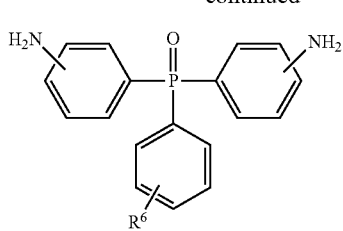 (6)

wherein in the general formula (5), $R^5$ represents a hydrocarbon group with a carbon number of 1 to 4; and in general formula (6), $R^6$ represents a hydrogen atom or an amino group;
  wherein [A] is present in an amount of 10 to 50 parts by mass and [B] is present in an amount of 50 to 90 parts by mass, totaling 100 parts by mass; and
  wherein [C] is present in amount to provide a phosphorus atom content of 1.0 to 5.0% by mass, based on the overall mass of the epoxy resin composition.

18. The epoxy resin composition according to claim 17, wherein $R^3$ and $R^4$ of the general formula (4) is a hydrogen atom.

19. The epoxy resin composition according to claim 17, wherein [C'] comprises an amine-based hardener having a structure represented by general formula (6).

20. The epoxy resin composition according to claim 19, wherein $R^6$ in the general formula (6) is an amino group.

21. The epoxy resin composition according to claim 17, wherein [D] comprises polyethersulfone.

22. The epoxy resin composition according to claim 21, wherein [D] is present in amount of 24 to 27 parts by mass based on the total 100 parts by mass of [A] and [B].

23. The epoxy resin composition according to claim 17, wherein the optional aromatic polyamine hardener is not present, the epoxy resin composition has a viscosity increase ratio after 2 hours at 80° C. of 7% to 30%, and a cured product of the epoxy resin composition has a flexural modulus of 4.1 to 4.5 GPa and a char production ratio at 650° C. of 25% to 30%.

24. The epoxy resin composition according to claim 17, wherein the optional aromatic polyamine hardener is present and is 3,3'-diaminodiphenyl sulfone.

25. The epoxy resin composition according to claim 24, wherein the epoxy resin composition has a viscosity increase ratio after 2 hours at 80° C. of 13% to 47%, and a cured product of the epoxy resin composition has a flexural modulus of 4.3 to 4.6 GPa and a char production ratio at 650° C. of 11% to 17%.

26. A prepreg obtained by impregnating a reinforced fiber with the epoxy resin composition described in claim 17.

27. A fiber-reinforced composite material obtained by curing the prepreg described in claim 26.

28. A fiber-reinforced composite material comprising a cured resin obtained by curing the epoxy resin composition described in claim 17, and a reinforced fiber.

* * * * *

UNITED STATES PATENT AND TRADEMARK OFFICE
CERTIFICATE OF CORRECTION

PATENT NO. : 11,441,027 B2
APPLICATION NO. : 16/755945
DATED : September 13, 2022
INVENTOR(S) : Akihiko Ito It is certified that error appears in the above-identified patent and that said Letters Patent is hereby corrected as shown below:

On the Title Page

Item [57], Line 11, "of more functional groups." should read -- or more functional groups. --

In the Specification

At Column 9, Line 1, "[C]" should read -- [C'] --

In the Claims

In Claim 1, Column 21, Line 25, "viscosity of 2 Pas" should read -- viscosity of 2 Pa s --

In Claim 17, Column 24, Line 17, "comprising" should read -- comprising: --

In Claim 17, Column 24, Line 28, "[C] selected" should read -- [C'] selected --

In Claim 17, Column 25, Line 16, "wherein [A] is present" should read -- wherein [A'] is present --

In Claim 17, Column 25, Line 19, "wherein [C] is present" should read -- wherein [C'] is present --

In Claim 22, Column 26, Line 5, "mass of [A]" should read -- mass of [A' ] --

Signed and Sealed this
Thirteenth Day of December, 2022

*Katherine Kelly Vidal*
Katherine Kelly Vidal
*Director of the United States Patent and Trademark Office*